US008753199B2

(12) United States Patent
Velu

(10) Patent No.: US 8,753,199 B2
(45) Date of Patent: Jun. 17, 2014

(54) INSTANT PLAYER PROFILER

(75) Inventor: Muthu Velu, Addison, IL (US)

(73) Assignee: WMS Gaming, Inc., Waukegan, IL (US)

( * ) Notice: Subject to any disclaimer, the term of this patent is extended or adjusted under 35 U.S.C. 154(b) by 380 days.

(21) Appl. No.: 12/864,309

(22) PCT Filed: Jan. 30, 2009

(86) PCT No.: PCT/US2009/032636
§ 371 (c)(1),
(2), (4) Date: Jul. 23, 2010

(87) PCT Pub. No.: WO2009/097523
PCT Pub. Date: Aug. 6, 2009

(65) Prior Publication Data

US 2010/0317435 A1 Dec. 16, 2010

Related U.S. Application Data

(60) Provisional application No. 61/025,064, filed on Jan. 31, 2008.

(51) Int. Cl.
*A63F 9/24* (2006.01)
*G06F 3/048* (2013.01)

(52) U.S. Cl.
USPC ................ 463/29; 463/16; 463/42; 715/769; 715/811; 715/841; 715/843; 715/866

(58) Field of Classification Search
CPC . A63F 13/12; G07F 17/3237; G07F 17/3262; G07F 17/3227; G06F 3/0482; G06F 3/0484; G06F 3/04845; G06F 3/04846; G06F 3/04842
USPC ................ 463/30–34, 42, 43, 16–20, 25, 29; 715/700, 764, 765, 769, 810, 811, 715/835–837, 840, 843, 866, 84; 345/619, 345/672, 676, 681, 682, 689
See application file for complete search history.

(56) References Cited

U.S. PATENT DOCUMENTS 5,779,549 A 7/1998 Walker et al.
6,068,552 A 5/2000 Walker et al.

(Continued)

FOREIGN PATENT DOCUMENTS

WO WO-2009097523 8/2009

OTHER PUBLICATIONS

"HOTSPOT Platinum/Casino game board kits", 1999-2012,http://www.alibaba.com/product-gs/298247673/Gaminator_Coolfire_1_slot_game_board.html?newId=616869506&pn=7&pt=10&t=12&cids=.*

(Continued)

*Primary Examiner* — Damon Pierce
(74) *Attorney, Agent, or Firm* — DeLizio Gilliam, PLLC

(57) ABSTRACT

Described herein are processes and devices that automatically generate a player profile. One of the devices described is a wagering game system. The wagering game system can present a plurality of pictures on a wagering game machine, kiosk, or other network device. The plurality of pictures includes aesthetic content. The wagering game system can receive player input indicating a preference for the aesthetic content of at least one of the plurality of pictures. The wagering game system can generate a wagering game player profile to store player preferences associated with wagering games and wagering game machines. The wagering game system can assign values to the player preferences based on the preference for the aesthetic content.

18 Claims, 8 Drawing Sheets

(56) References Cited

U.S. PATENT DOCUMENTS

| | | | |
|---|---|---|---|
| 6,110,041 | A | 8/2000 | Walker et al. |
| 6,254,483 | B1 | 7/2001 | Acres |
| 6,293,866 | B1 | 9/2001 | Walker et al. |
| 6,342,010 | B1 | 1/2002 | Slifer |
| 6,350,199 | B1 | 2/2002 | Williams et al. |
| 6,353,772 | B1 | 3/2002 | Silverbrook |
| 6,520,856 | B1 | 2/2003 | Walker et al. |
| 6,628,939 | B2 | 9/2003 | Paulsen |
| 6,769,986 | B2 | 8/2004 | Vancura |
| 7,033,276 | B2 | 4/2006 | Walker et al. |
| 7,040,987 | B2 | 5/2006 | Walker et al. |
| 7,054,508 | B2 | 5/2006 | Hanamoto |
| 7,169,052 | B2 | 1/2007 | Beaulieu et al. |
| 2002/0142825 | A1 | 10/2002 | Lark et al. |
| 2002/0142846 | A1 | 10/2002 | Paulsen |
| 2003/0003988 | A1 | 1/2003 | Walker et al. |
| 2004/0048657 | A1 | 3/2004 | Gauselmann |
| 2004/0142747 | A1 | 7/2004 | Pryzby |
| 2004/0166940 | A1 | 8/2004 | Rothschild |
| 2004/0180712 | A1 | 9/2004 | Forman et al. |
| 2005/0043092 | A1 | 2/2005 | Gauselmann |
| 2005/0170890 | A1 | 8/2005 | Rowe et al. |
| 2005/0277469 | A1 | 12/2005 | Pryzby et al. |
| 2008/0020845 | A1 * | 1/2008 | Low et al. ....................... 463/42 |

OTHER PUBLICATIONS

"PCT Application No. PCT/US09/32636 International Preliminary Report on Patentability", Aug. 16, 2010 , 12 pages.

"PCT Application No. PCT/US09/32636 International Search Report", Mar. 13, 2009 , 8 pages.

* cited by examiner

INSTANT PLAYER PROFILER

RELATED APPLICATIONS

This application claims the priority benefit of U.S. Provisional Application Ser. No. 61/025,064 filed Jan. 31, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

BACKGROUND

1. Technical Field

Embodiments of the inventive subject matter relate generally to wagering game systems, and more particularly to devices and processes that automatically generate a player profile for wagering game systems and networks.

2. Background Art

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, one or more machine-readable media having instructions stored thereon, which when executed by a set of one or more processors causes the set of one or more processors to perform operations comprises presenting a plurality of pictures, wherein each of the plurality of pictures includes aesthetic content; receiving player input indicating a preference for the aesthetic content of at least one of the plurality of pictures; generating a wagering game player profile to store player preferences associated with wagering games and wagering game machines; and assigning values to the player preferences based on the preference for the aesthetic content.

In some embodiments, the player input represents a rating indicating a strength of the preference.

In some embodiments, at least one of the player preferences indicates a theme for graphics and audio associated with available wagering games.

In some embodiments, the operation for assigning values comprises comparing a description of the aesthetic content to a description of the theme and deducing the values of the player preference based on the description of the theme.

In some embodiments, the theme comprises one or more of a television show theme, a science fiction theme, a western theme, and a movie theme.

In some embodiments, the operation for presenting a plurality pictures comprises presenting the plurality of pictures in conjunction with a wagering game to determine feedback for the wagering game.

In some embodiments, the operations further comprise detecting a pattern of player input regarding specific aesthetic content, and using the pattern of player input to generate any one or more of the player preferences and additional pluralities of pictures to present.

In some embodiments, a method comprises presenting a first set of at least two images on a device, the at least two images depicting differing thematic content; detecting a selected image of one of the at least two images; determining metadata associated with the selected image describing the thematic content of the selected image; inferring a wagering game preference based on the metadata; and generating a player profile indicating the wagering game preference.

In some embodiments, the method further comprises determining a second set of images based on the selected image from the first set.

In some embodiments, the method further comprises presenting a plurality of sub-images related to the selected image; and detecting a player response to the sub-images indicating ratings for the sub-images.

In some embodiments, the wagering game preference indicates a theme for graphics and audio associated with available wagering game.

In some embodiments, the method further comprises determining one or more available wagering games using the inferred wagering game preference; and presenting the one or more wagering games.

In some embodiments, determining one or more wagering games comprises using the metadata to search for wagering game content on a wagering game store, wherein the wagering game store comprises wagering game information that is similar to the metadata.

In some embodiments, a system comprises a wagering game machine comprises, an item comparison controller configured to present a plurality of pictures, wherein each of the plurality of pictures includes content that depicts a pictorial theme, a player input module configured to receive player input indicating an aesthetic preference for a pictorial theme of at least one of the plurality of pictures; and an account server comprising, an instant profiler processor configured to generate a wagering game player profile to store player preferences associated with wagering games and the wagering game machine, and assign values to the player preferences based on the player input indicating the aesthetic preference.

In some embodiments, the player preferences indicate a wagering game content theme for content associated with a wagering game.

In some embodiments, the at least one of the plurality of pictures comprises descriptive metadata that describes its pictorial theme, and wherein the instant profiler processor is configured to compare the descriptive metadata for the pictorial theme to descriptive data that describes the wagering game content theme, to deduce the values to assign to the player preference.

In some embodiments, the item comparison controller is further configured to present a plurality of sub-pictures that depict differing pictorial themes related to the pictorial theme of the at least one of the plurality of pictures, receive player input indicating aesthetic preferences for one or more of the plurality of sub-images, and determine a preference ranking for the differing pictorial themes of the one or more of the plurality of sub-images.

In some embodiments, the item comparison controller is configured to use the player input to determine the plurality of sub-pictures.

In some embodiments, the item comparison controller is configured to present the plurality or pictures in conjunction with a wagering game to determine feedback for the wagering game.

In some embodiments, the system further comprises a wagering game server configured to determine one or more available wagering game themes using the player preferences, and present the one or more available wagering game themes on the wagering game machine.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into five sections. The first section provides an introduction to embodiments. The second section describes example operating environments while the third section describes example operations performed by some embodiments. The fourth section describes additional example operating environments while the fifth section presents some general comments.

Introduction

This section provides an introduction to some embodiments.

Figure 1:
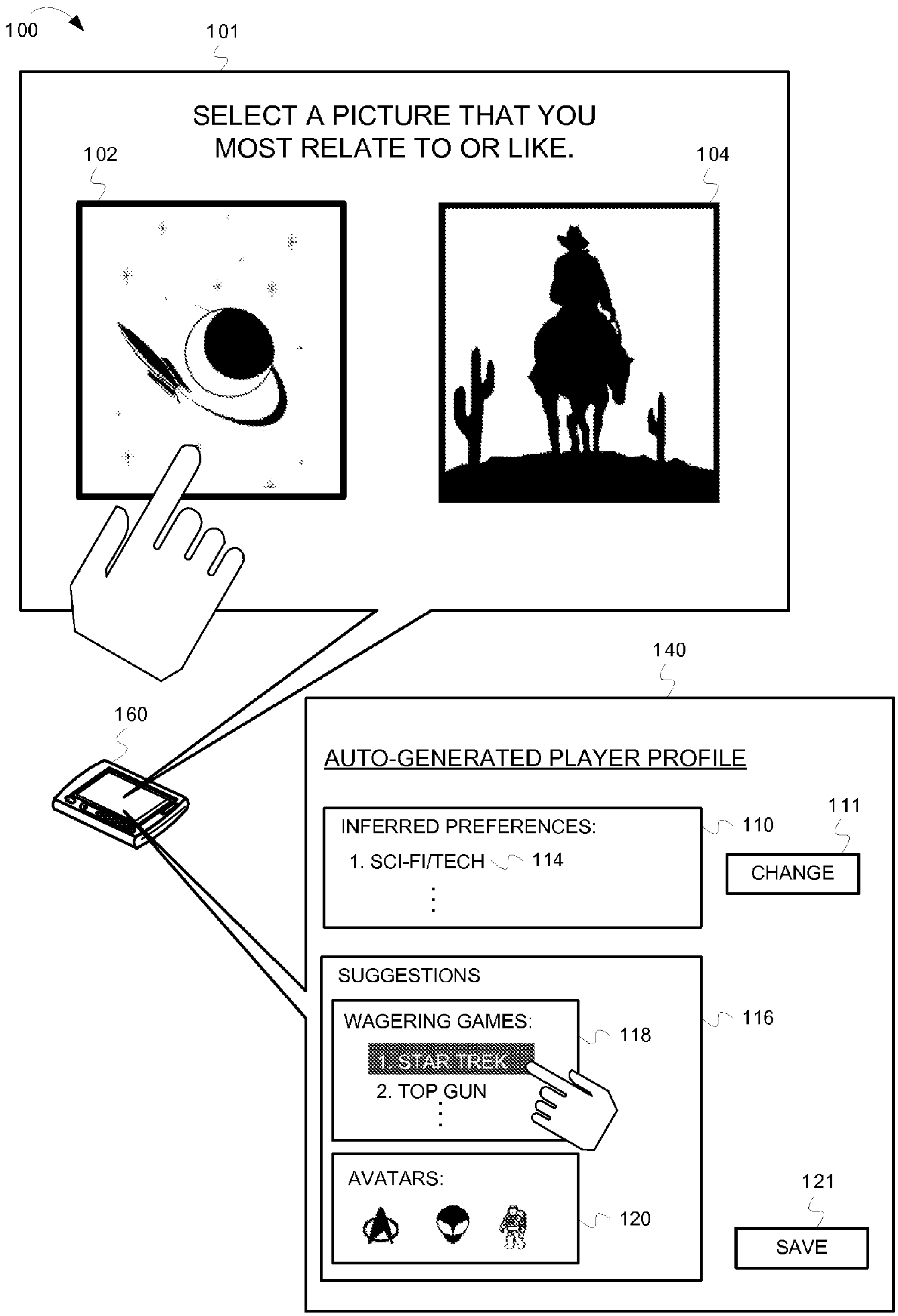
FIG. 1 is an illustration of a wagering game system 100, according to some embodiments.

The wagering game industry produces a large selection of wagering games for wagering game enthusiasts to play. Wagering game players, however, face the dilemma of finding wagering games that they might like from the large selection of available games. Some current systems can track a player's history, or rating of games, and generate a list of favorite games, but such systems require a wagering game player to first play one or more games that the player may or may not like. Other systems can ask a player to indicate one or more wagering game themes, types, etc., that the player may like. However, a wagering game player may have varied interests that they may not be able to adequately describe using such systems. Plus, such systems can be so uninteresting that the wagering game player becomes discouraged with responding to questions. Thus, current systems have a host of challenges that make the player profile process difficult, dull, or burdensome to a wagering game player. FIG. 1 shows a wagering game system 100 configured to automatically generate a player game profile with wagering game preferences.

FIG. 1 is a conceptual diagram that illustrates an example of a wagering game system 100, according to some embodiments. In FIG. 1, a wagering game system ("system") 100 includes a wagering game machine 160, or other network device, with a picture comparison screen 101. The picture comparison screen 101 presents a set of pictures 102 and 104 for a wagering game player ("player") to view, then choose which one of the pictures 102, 104 that the player likes, relates to, etc. The system 100 then automatically generates a player profile 140 based on the player's responses to the set of pictures 102, 104. The pictures 102, 104 are images depicting differing (e.g., contrasting) scenarios, objects, concepts, etc. For example, picture 102 depicts a "space" scenario, whereas picture 104 depicts a "cowboy" scenario. The picture comparison screen 101 displays the picture set 102, 104. The picture set (102 and 104) can test a potential preference of the player for one of the pictures. Each picture contains metadata (e.g., topics, descriptions, etc.), hidden from the player's view. The metadata corresponds to one or more ideas, concepts, interests, etc. that the picture comparison screen 101 is testing. For example, for the "space" picture 102 the system 100 stores one or more strings of descriptive data or concepts (e.g., "space", "technology", "science fiction", etc.) that describe the picture 102. Likewise, for the "cowboy" picture 104, the system 100 stores descriptive data (e.g., "adventure", "outdoors", "old-west", "cowboy", etc.). If, for instance, the player selects the picture 102, the system 100 captures the player's selection of the picture 102 and refers to the selected picture's metadata. Based on the metadata related to the selected picture 102, the system automatically deduces (e.g., infers) preferences for the player and generates a player profile 140. In other words, the system 100 directly determines a player's preference for a picture, and based on that player's selection of the picture, indirectly determines the player's preference for wagering games.

The player profile 140 contains the inferred preferences 110. For example, if the player selected the "space" picture 102 over the "cowboy" picture 104, based on the metadata for the picture 102, the system 100 infers that the player prefers technology, science, science fiction, etc. The system could list the inferred preferences in a ranked list 114. Based on the inferred preferences 110, the system 100 can provide suggestions 116. The suggestions 116 can be for potential wagering games 118, avatars 120, or other information that relates to the inferred preferences 110. The system 100 can also accept player feedback or input. For example, the player can select any of the suggestions 116, which the system 100 can store or activate. The system 100 can provide an update option 111 to change the inferred preferences. The system can also provide a save option 121, which, when activated, saves the player's updates.

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures and wagering game networks.

Example Wagering Game System Architecture

Figure 2:
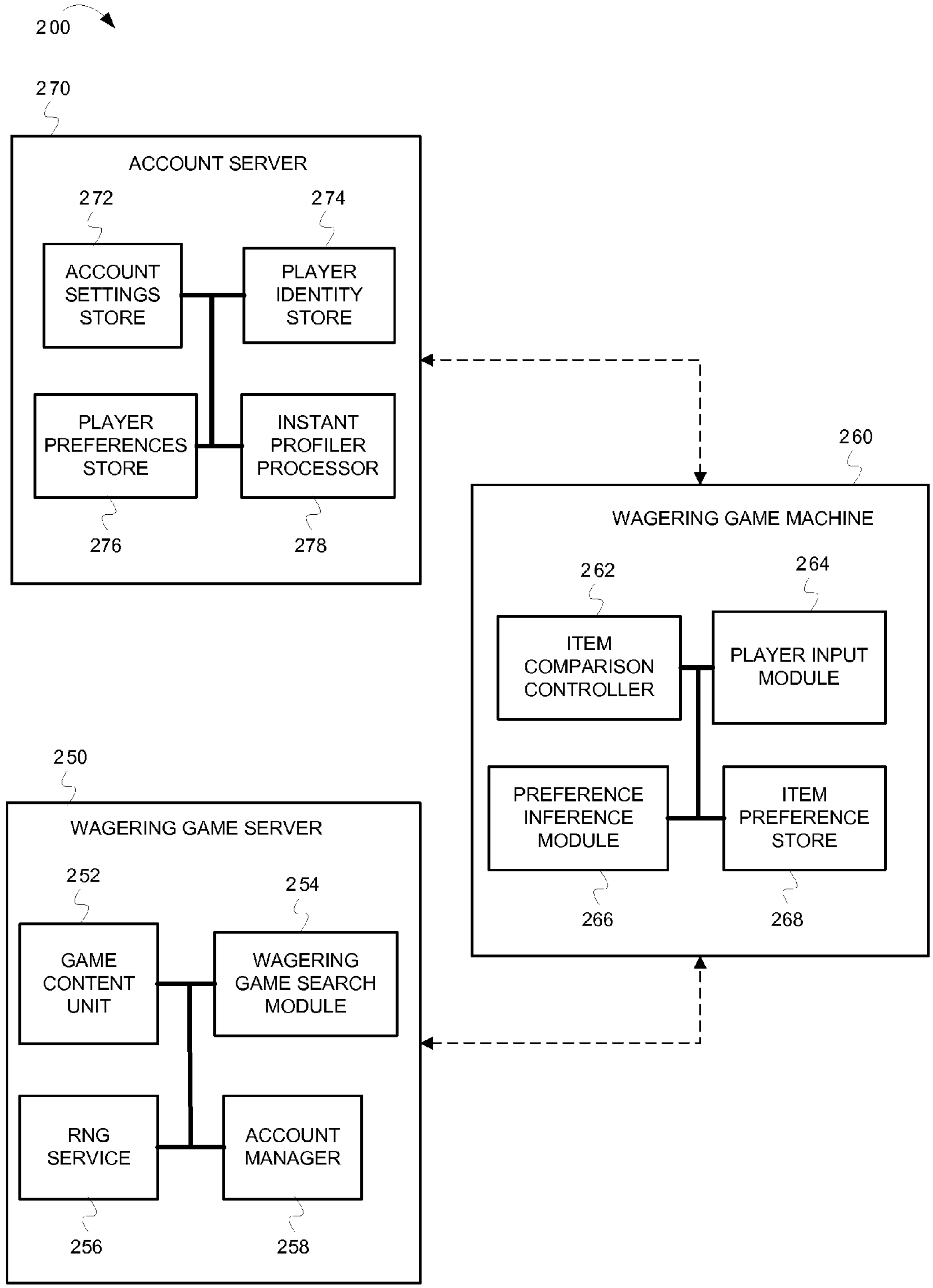
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include a wagering game machine 260 configured to present wagering games and receive and transmit information to automatically generate a player profile. The wagering game machine 260 can include an item comparison controller 262 configured to present items (e.g., pictures, sounds, etc.) for a player to compare. The wagering game machine 260 also can include a player input module 264 configured to capture player input regarding a player's preferences for presented items. The wagering game machine 260 also can include a preference inference module 266 configured to infer preferences for wagering game content based on a players responses to presented items. The wagering game machine 260 also can include an item preference store 268 configured to store a player's selection of items, arrangement of items, preference input, etc.

The wagering game system architecture 200 also can include a wagering game server 250 configured to control wagering game content and communicate wagering game information, account information, and player profiler information to and from a wagering game machine 260. The wagering game server 250 can include a game content unit 252 configured to contain wagering game content for presentation on the wagering game device 260. The wagering game server 250 also can include a wagering game search module 254 configured to search for wagering games utilizing inferred preferences and information related to player profiler items. The wagering game server 250 also can include a random number generation service 256 configured to generate random numbers for use with wagering games. The wagering game server 250 also can include an account manager 258 configured to control information related to player accounts.

The wagering game system architecture 200 also can include an account server 270 configured to control user related accounts accessible via wagering game networks and social networks. The account server 270 can store and track player information, such as identifying information (e.g., avatars, screen name, account id numbers, etc.) or other information like financial account information, social contact information, etc. The account server 270 can contain accounts for social contacts referenced by the player account. The account server 270 can include an account settings store 272 configured to store information about settings for a player's account. The account server 270 also can include a player identity store 274 configured to store identifying information about a player's account. The account server 270 also can include a player preferences store 276 configured to store preferences information about a player's account. The account server 270 also can include an instant profiler processor 278 configured to generate and present preferences in a profile, to determine suggestions, etc., based on a player's responses to item comparisons, such as to the picture comparison set 102, 104 in FIG. 1.

Each component shown in the wagering game system architecture 200 is shown as a separate and distinct element. However, some functions performed by one component could be performed by other components. For example, the wagering game server 250 could determine preferences, store item comparison sets, etc. Furthermore, the components shown may all be contained in one device, but some, or all, may be included in, or performed by multiple devices on wagering game systems and networks, as in the configurations shown in FIG. 2, or other configurations not shown. Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Wagering Game Network

Figure 3:
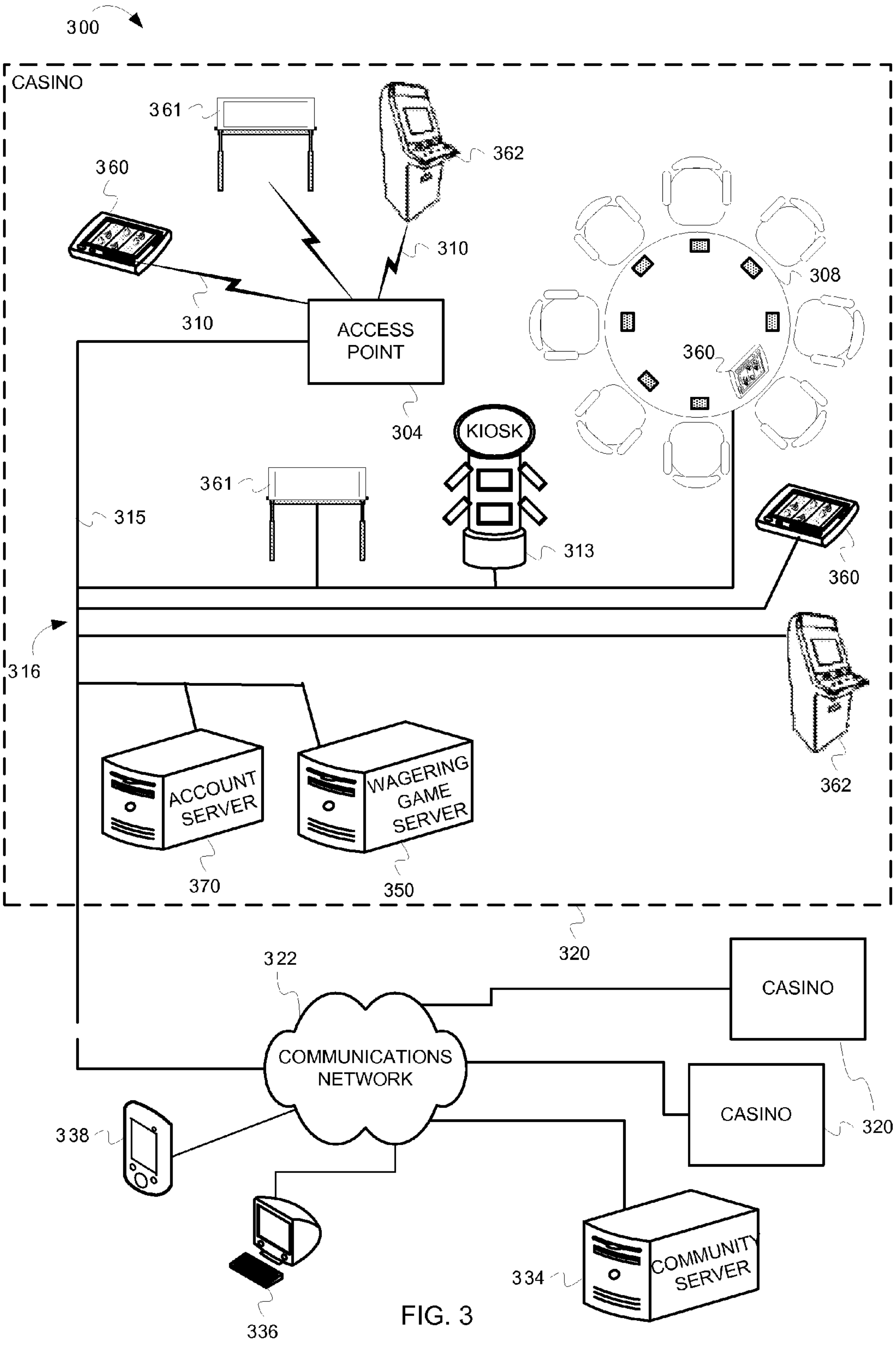
FIG. 3 is an illustration of a wagering game network 300, according to some embodiments.

FIG. 3 is a conceptual diagram that illustrates an example of a wagering game network 300, according to some embodiments. The wagering game network 300 includes example embodiments of the components described vis-à-vis FIG. 2. In FIG. 3, the wagering game network 300 includes a plurality of casinos 320 connected to a communications network 322. Each casino 320 includes a local area network 316, which includes an access point 304, one or more servers 350, 370 and wagering game machines 360, 361, 362. In one embodiment, the local area network 316 may also include specific types of servers, such as wagering game servers, promotions servers, player information servers, management servers, social networking servers, progressive game servers, player tracking servers, file servers, web servers, application servers, database servers, and casino and player account servers. There are many other devices, in other embodiments, that are not shown but that may exist in a wagering game network (e.g., routers, switches, monitoring equipment, etc.). The access point 304 provides wireless communication links 310 with wagering game machines 360, 361, 362. The local area network 316 may also include wired communication links 315 to connect to servers 350, 370, wireless access point 304, wagering game machines 360, 361, 362, one or more docking stations 308 and one or more kiosks 313 for storing mobile machines. The wired and wireless communication links can employ any suitable connection technology, such as Bluetooth, 801.11, Ethernet, public switched telephone networks, SONET, etc. In some embodiments, the servers 350, 370, can serve wagering games and distribute content to devices located in other casinos 320 or at other locations on the communications network 322. In some embodiments, the servers 350, 370, can serve wagering games and distribute content to devices located outside of casinos, such as to a personal computer 336, a hand-held personal digital assistant 338, a community server 318, etc.

The wagering game machines 360, 361, 362 described herein can take any suitable form, such as floor standing models (e.g., 362), handheld mobile units (e.g., 360), bar-top models, workstation-type console models, surface computing machines (e.g., 361), etc. Further, the wagering game machines 360, 361, 362 can be primarily dedicated for use in conducting wagering games, or can include non-dedicated devices, such as mobile phones, personal digital assistants, personal computers, etc.

In some embodiments, the wagering game machines 360, 361, 362 and the wagering game server 350 work together such that wagering game machines 360, 361, 362 can be operated as a thin, thick, or intermediate client. For example, one or more elements of game play may be controlled by the wagering game machines 360, 361, 362 (client) or the wagering game server 350. Game play elements can include executable game code, lookup tables, configuration files, game outcome, audio or visual representations of the game, game assets or the like. In a thin-client example, the wagering game server 350 can perform functions such as determining game outcome or managing assets, while the wagering game machines 360, 361, 362 can present a graphical representation of such outcome or asset modification to the user (e.g., player). In a thick-client example, the wagering game machines 360, 361, 362 can determine game outcomes and communicate the outcomes to the wagering game server 350 for recording or managing a player's account.

In some embodiments, either the wagering game machines 360, 361, 362 (client) or the wagering game server 350 can provide functionality that is not directly related to game play. For example, account transactions and account rules may be managed centrally (e.g., by the wagering game server 350) or locally (e.g., by the wagering game machines 360, 361, 362). Other functionality not directly related to game play may include power management, presentation of advertising, software or firmware updates, system quality or security checks, community management, real-time messaging, etc.

The wagering game network 300 can automatically generate a player profile. The wagering game network 300 may be internal or external to a casino 320 and may interact with any suitable wagering game network component to automatically generate a player profile. In some embodiments, any one of the components can reside inside any of the other network components (e.g., wagering game server 350, account server 370, wagering game machines 360, 361, 362, etc.)

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 4:
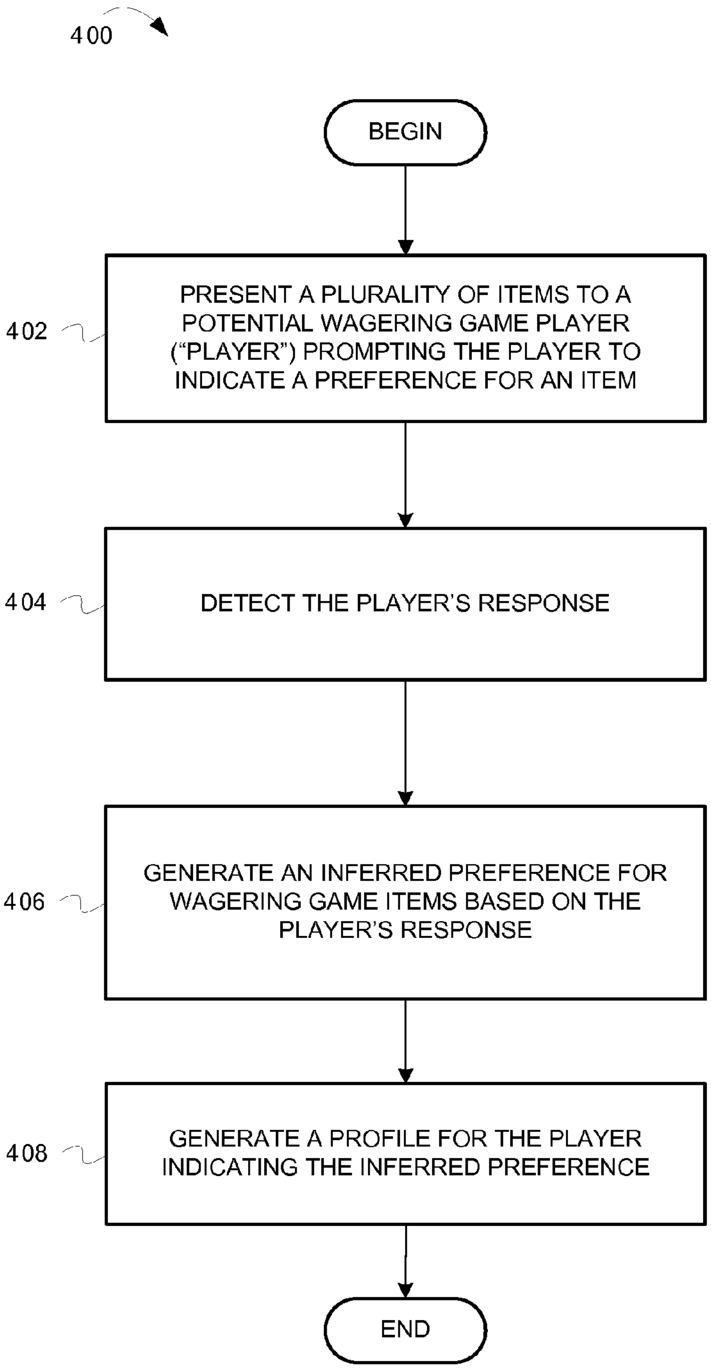
FIG. 4 is a flow diagram 400 illustrating deducing wagering game preferences for a wagering game player, according to some embodiments.
Figure 6:
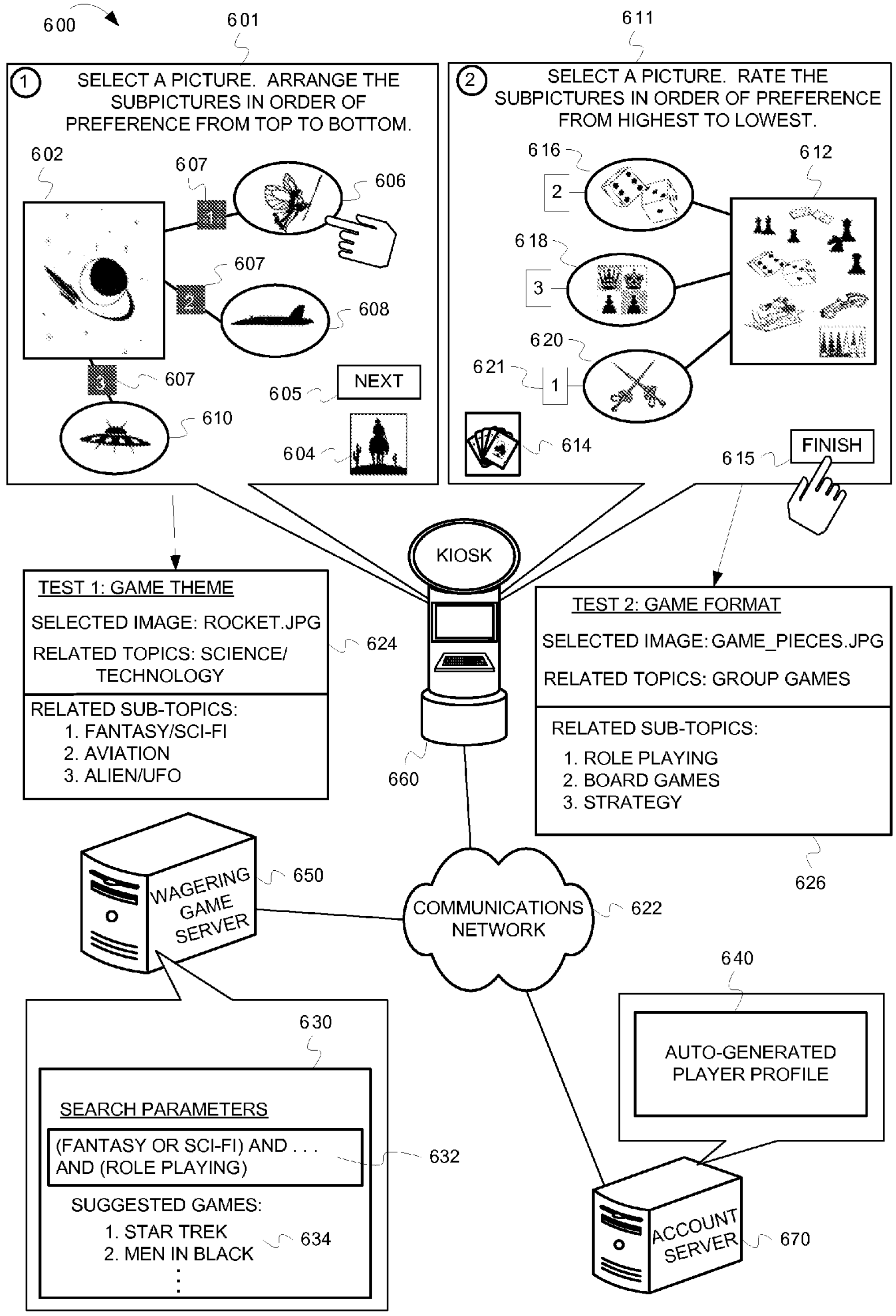
FIG. 6 is an illustration of presenting multiple pictures to a player to generate inferred preferences for wagering games, according to some embodiments.

FIG. 4 is a flow diagram illustrating deducing wagering game preferences for a wagering game player, according to some embodiments. In FIG. 4, the flow 400 begins at processing block 402, where a wagering game system presents a plurality of items to a potential wagering game player ("player") prompting the player to indicate a preference for an item. The system presents a plurality of items on a wagering game machine, kiosk, or other device configured to present items. The items can include objects, pictures, sounds, etc., that a player can perceive through sight, sound, touch, etc. The items are presented to convey concepts, ideas, thoughts, etc., with which a player can relate or express a preference, a like, a dislike, or other such opinion. The concepts, ideas, thoughts, etc. can differ from each other. The system prompts the player to select between the perceptible items to indicate which of the items the player prefers. The system can prompt the player to select more than one, but not all, of the plurality of the items (e.g., "choose 1 out of the 2 pictures on the screen that you prefer", "choose 3 out of 4 pictures on the screen . . . ", etc.) FIG. 1 shows an example embodiment that presents two picture items that contrast in concept, and prompts the user to select one of the pictures. However, other embodiments of a system can present more than two pictures at a time. The system can prompt the player to select as many of the pictures that the player prefers. In some embodiments, the system can prompt users to select pictures that the player dislikes or does not prefer, instead of pictures that the user does prefer. The system can then infer a preference for the unselected pictures. In some embodiments, the system can capture user input regarding a multitude of pictures. In some embodiments, the system can present options for the player to rank or rate a multitude of pictures, to describe reasons for liking or disliking pictures, etc. FIG. 6 (discussed below) illustrates an example embodiment of a system that detects an arrangement of pictures and automatically assigns ratings. In some embodiments, the system can present items other than pictures, such as a plurality of sounds, sensations, smells, etc. in conjunction with, or instead of, pictures and asks for the player's preferences. In some embodiments, the system can present a plurality of written concepts or ideas, scenarios, stories, etc., and prompt for a player's preferences. The system can test the player's state of mind, desires, sense of aesthetic, etc. through psychological association, creative connection, logical patterns, etc. presented in the perceptible items and later associates the player's response with wagering game items, such as described in processing block 406 (discussed below).

The flow 400 continues at processing block 404, where the wagering game system detects a player's response. The system detects a player's response to the perceptible items in different ways. FIG. 1 shows an example embodiment of a system that detects a player's selection between two pictures. In other embodiments, however, the player's response includes a selection between multiple items, input regarding items, etc., as described further above in conjunction with processing block 402.

The flow 400 continues at processing block 406, where the wagering game system generates an inferred preference for wagering game items based on the player's response. According to some embodiments, a system generates an inferred preference for wagering game activity by detecting information (e.g., metadata, settings, etc.) about the presented items. The items can have pre-determined data (i.e., data associated with the picture files, the sound files, etc.) that describes and defines the items ("descriptive information"). The descriptive information can be stored in a database entry associated with the presented item, in an attached or associated file, a configuration file or setting, etc. The system then uses the descriptive information and deduces, infers, or assumes that the player has an interest in, or preference for, the descriptive information. For instance, as described in FIG. 1, a player may have selected the "space" picture 102, therefore, the system 100 inferred that the player preferred the descriptive data of the picture 102 over the descriptive data of the picture 104. The system then applies the inferences to classifications of possible wagering game activities. Some wagering game activities include wagering games, bonuses, etc. The classifications of the wagering game activities may include wagering game themes, formats, costs, risk-factors, etc. The system can also use player input, descriptions, player history, recommendations of friends, etc., in addition to the player's selection of items, to make inferences.

The flow 400 continues at processing block 408, where the wagering game system generates a profile for the player indicating the inferred preference. The player profile can reside on an account server or any other network storage device. The player profile can be printed and delivered to the player. The player profile can also be presented to the player as part of an account display, similar to the player profile 140 in FIG. 1. When a player plays wagering games, the system track a player's actual player game history and checks to see how accurately the system inferred the player's preference for wagering game types. The system can then use this data to better refine any future tests the player may take to generate more accurate inferences.

Figure 5:
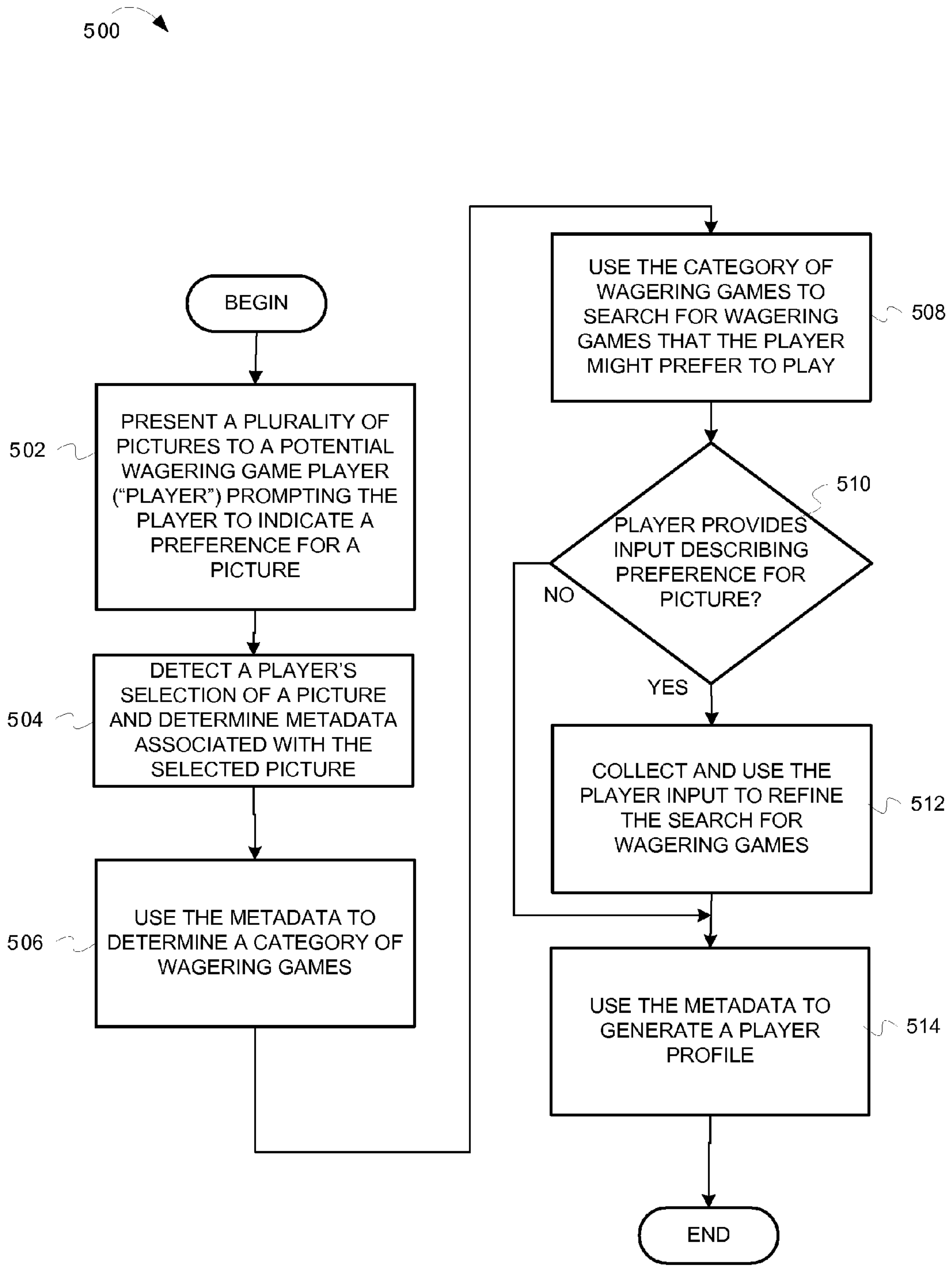
FIG. 5 is a flow diagram 500 illustrating automatically generating a player profile, according to some embodiments.

FIG. 5 is a flow diagram illustrating automatically generating a player profile, according to some embodiments. FIG. 6 is a conceptual diagram that illustrates an example of presenting multiple pictures to a player to generate inferred preferences for wagering games, according to some embodiments. This description will present FIG. 5 in concert with FIG. 6. In FIG. 5, the flow 500 begins at processing block 502, where a wagering game system presents a plurality of pictures to a potential wagering game player ("player") prompting the player to indicate a preference for a picture. In FIG. 6, a system 600 can present picture comparison screens on various different devices. For example, in FIG. 1, the system 100 utilized a wagering game machine 160. In FIG. 6, however, the system 600 utilizes a kiosk 660. In other embodiments, the system 600 can utilize other devices, like a computer, a cell phone, etc. The system 600 can provide a plurality of picture comparison screens 601, 611. As described in FIG. 1, the picture comparison screens can start with at least two pictures with differing concepts. For example, picture comparison screen 601 begins by displaying the pictures 602 and 604, which constitute an initial picture grouping. The initial picture grouping (602 and 604) tests a potential preference of the player for one of the pictures 602 and 604. The concepts of the pictures 602 and 604 can be related to wagering game categories, or types, of wagering game. For example, the first picture comparison screen 601 may test a preferred game "theme"; the second picture selection screen 611 may test a preferred game "format"; etc. In some embodiments, the system 600 can represent pictures from previously presented picture groupings. For example, the system 600 may have presented either of the pictures 602 or 604 in a previous picture comparison grouping, but is representing one of the pictures 602, 604 in the current picture grouping. The system 600 could also present any of the pictures 602, 604 in subsequent picture groupings.

The flow 500 continues at processing block 504, where the wagering game system detects a player's selection of a picture and determines metadata associated with the selected picture. In FIG. 6, the system 600 can minimize the unselected picture 604 when the player selects one of the pictures, such as picture 602, from the initial picture grouping 602, 604.

The flow 500 continues at processing block 506, where the wagering game system uses the metadata to determine a category of wagering games. In FIG. 6, the system 600 stores test metadata for the selected pictures 602 and 612 on a database. For instance, when the player selects the picture 602 from the first picture comparison screen 601, the system 600 refers to a database entry 624 to reference the picture metadata. The database entry 624 contains information that describes the picture 602 (e.g., "rocket.jpg") and its related topic(s) (e.g., "science" and "technology").

The flow 500 continues at processing block 508, where the wagering game system uses the category of wagering games to search for wagering games that the player might prefer to play. In FIG. 6, the system 600 can used the metadata from the database entries 624, 626 to search for wagering games to suggest. For example, the system 600 can search a wagering game server 650 using a search option 630. The search feature 630 can combine one or more related topics and sub-topics from the database entries 624, 626 into a search string 632. The system 600 then searches the wagering game server 650 using the search string 632 and produces one or more suggested wagering games 634. The system 600 can run multiple searches and combine or cross-reference search results. The system can also gather and use data from a player's already existing account(s) stored on the account server 640, from player history stored on the wagering game server 650, or other servers and devices no shown (e.g., a community server).

The flow 500 continues at processing block 510, where the wagering game system determines whether the player provides input describing a preference for a picture. The system can determine input in many ways. One way is to prompt a user to describe reasons for selecting a picture. Another way is to present another picture combination that further refines the concepts of selected pictures in previous picture combinations. Yet another way is to present additional pictures on the same picture selection screen. For example, in FIG. 6, the system 600 can present additional pictures ("sub-pictures") 606, 608, and 610 in conjunction with the selected picture 602. Each sub-picture can represent a related sub-topic, sub-concept, etc. based on the topic or concept of the selected picture 602. For instance, the sub-picture 606 relates to the sub-concept or sub-topic of "fantasy" or "science fiction", the sub-picture 608 relates to "aviation", and the third sub-picture 610 relates to "aliens" or "unidentified-flying-objects". The system 600 can present different options or settings that allow a player to arrange, order, or classify their preferences for the sub-pictures 606, 608, and 610. For example, the first picture comparison screen can prompt the player to arrange the sub-pictures 606, 608 and 610 in order of preference from top to bottom on the picture comparison screen 601. If the system determines that the player provides input describing preferences, then the process continues at block 512. If not, then the process continues at block 514.

The flow 500 continues at processing block 512, where the wagering game system collects and uses the player input to refine the search for wagering games. For example, in FIG. 6, the system 600 presents the sub-pictures 606, 608, 610 as movable objects, which the player can drag around the screen and drop into a desired position. The system 600 can also present some additional data, such as automatically generated rating scores 607 based on the order of the sub-pictures 606, 608, 610 on the picture comparison screen 601 from top to bottom. The system 600 presents a progress button 605, to move to the second picture comparison screen 611, and so on. The second picture comparison screen 611 compares a second picture grouping (612, 614). The second comparison screen 611 can learn from any picture comparison screen that precedes it, such as the first picture comparison screen 601. Thus, the system 600 can intelligently determine and present pictures that can further narrow the player's preferences based on a player's picture selections. Other embodiments, however, may present pictures according to a set pattern, or randomly, without referring to previous picture selections. In some embodiments, the system 600 can detect general picture selection patterns that the player makes and store the pattern to further refine picture groupings or sets.

Further, the picture comparison screen 611 can present sub-pictures 616, 618, and 620, similar to those shown in the first picture comparison screen 601. Further, in the second picture selection screen 611, the system 600 can capture type-written input from the player as it relates to the selected picture 612, or any of the sub-pictures 616, 618, 620. For example, the system 600 prompts the player to rate the sub-pictures 616, 618, 620, using a numerical rating score 621. In other examples, the system 600 can prompt a player to enter text descriptions describing why the player prefers the picture 612 or sub-pictures 616, 618, 620. The system 600 can then utilize the text descriptions when generating related meta-data. The system 600 presents a button 615 to complete the instant profile session. In some embodiments, the system 600 can present the sub-pictures 606, 608, 610, 616, 618, 620 on subsequent picture displays as separate picture groupings.

Further, the system 600 includes a database entry 624 that contains information that describes the sub-pictures 606, 608, 610 as well as any related sub-topics that relate to the individual sub-pictures 606, 608, 610. The system 600 can generate an order for the related sub-topics based on the player input. For the second picture comparison screen 611, the system 600 can refer to a second database entry 626, which also contains descriptive information (e.g., metadata, settings, etc.) for the selected picture 612, and the sub-pictures 616, 618, 620.

The flow 500 continues at processing block 514, where the wagering game system uses the descriptive information to generate a player profile. The profile can include a list of potential wagering games (e.g., titles and/or samples of wagering game content). In other embodiments, the system can present other information, such as preference metadata, like shown in FIG. 1 above. In FIG. 6, the system 600 infers preferences based on the descriptive information stored within the database entries 624, 626 and stores the inferred preferences in the auto-generated player profile 640. The auto-generated player profile 640 can be stored on a network server, like the account server 670. In other embodiment, however, the system 600 could present profile preferences, wagering games, etc., on the kiosk 660 or on another device, without storing the information in an account.

Referring to FIG. 5, in some embodiments, the system can use picture groupings to determine wagering game preferences before a player plays wagering games. In other embodiments, the system can use pictures and sub-pictures to generate instant player feedback, such as by presenting pictures during part of, or in connection with, a wagering game and detecting a player's selection of the preferred picture. For example, a player may have completed playing a wagering game, and while waiting for a cash-out procedure, the system can present picture groupings that convey emotional expressions (e.g., a smiling face, a frowning face, etc.) the player might have about one or more aspects of the wagering game. The player can select from the picture groupings to convey their feedback for the wagering game aspects. The system can determine appropriate times when to present picture groupings for wagering game feedback. For example, the system can prompt feedback through picture groupings when a player has played for specific amount of time, spent a specific amount of money, when the wagering game machine has credits but appears to be idle, etc. The system can also reward players that offer feedback.

In some embodiments described above, the system can suggest wagering games based on inferred preferences. The suggested wagering games can be games that are designed to have a specific theme, format, layout, etc. The system can suggest games with themes (e.g., images, audio, story-line, etc.) that match an inferred preference (e.g., the system suggests science fiction theme games to a player whose preferences are inferred to be science-fiction related.) On the other hand, some wagering games can be designed to have modular themes, or themes that can change while keeping the same game functionality. For example, a wagering game can present a poker game with a theme (e.g., images, audio, story-line, etc.) that changes based on a player's preferences. Thus, the system, in some embodiments, can suggest wagering game themes based on the inferred preferences. In some embodiments, the system can automatically alter the theme for a wagering game to match an inferred preference. Thus, the auto-generated, instant player profile can be used to personalize or customize aesthetics aspects of a wagering game.

Additional Example Operating Environments

This section describes example operating environments, systems and networks, and presents structural aspects of some embodiments.

Example Wagering Game Machine Architecture

Figure 7:
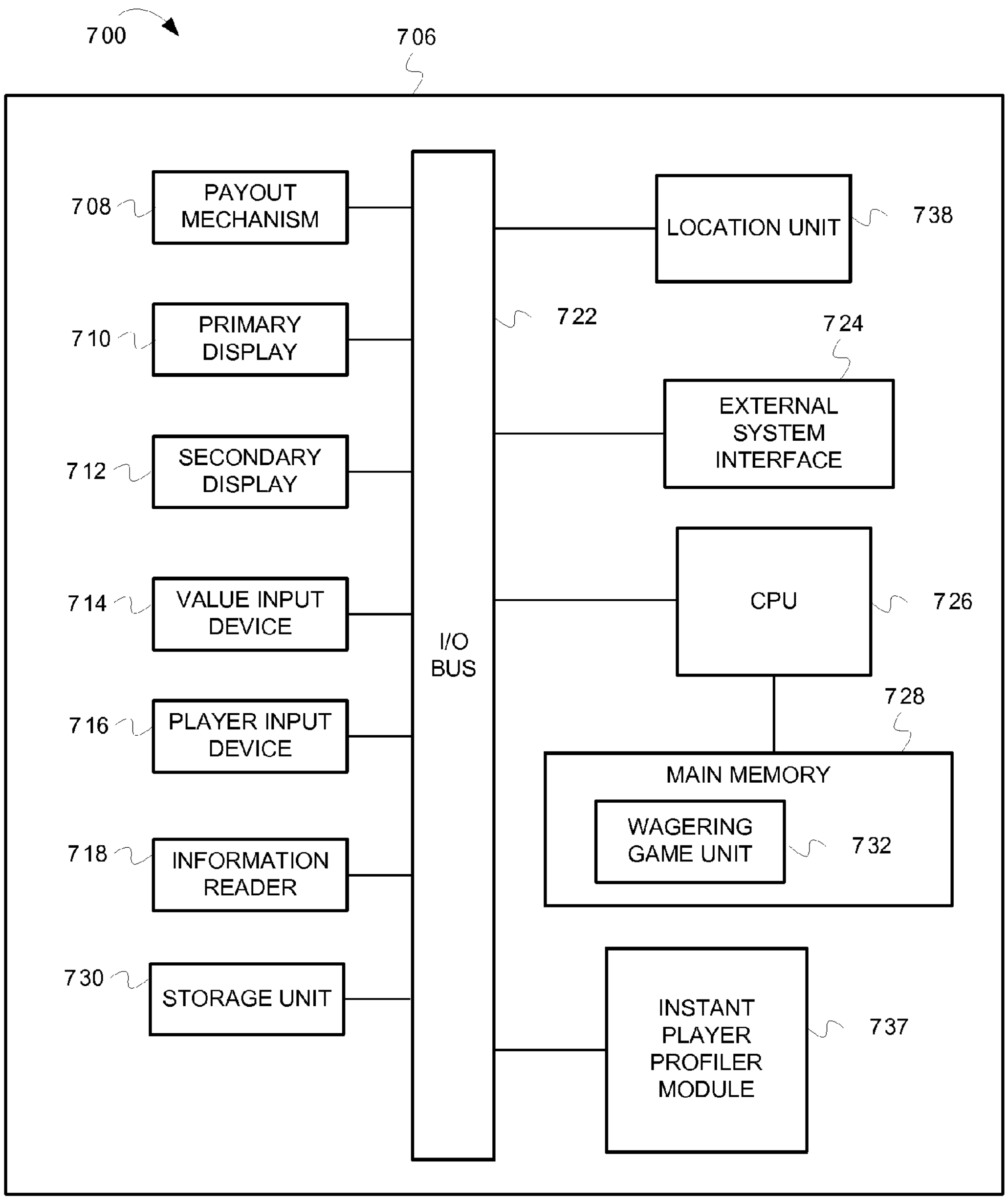
FIG. 7 is an illustration of a wagering game machine architecture 700, according to some embodiments.

FIG. 7 is a conceptual diagram that illustrates an example of a wagering game machine architecture 700, according to some embodiments. In FIG. 7, the wagering game machine architecture 700 includes a wagering game machine 706, which includes a central processing unit (CPU) 726 connected to main memory 728. The CPU 726 can include any suitable processor, such as an Intel® Pentium processor, Intel® Core 2 Duo processor, AMD Opteron™ processor, or UltraSPARC processor. The main memory 728 includes a wagering game unit 732. In one embodiment, the wagering game unit 732 can present wagering games, such as video poker, video black jack, video slots, video lottery, reel slots, etc., in whole or part.

The CPU 726 is also connected to an input/output ("I/O") bus 722, which can include any suitable bus technologies, such as an AGTL+ frontside bus and a PCI backside bus. The I/O bus 722 is connected to a payout mechanism 708, primary display 710, secondary display 712, value input device 714, player input device 716, information reader 718, and storage unit 730. The player input device 716 can include the value input device 714 to the extent the player input device 716 is used to place wagers. The I/O bus 722 is also connected to an external system interface 724, which is connected to external systems 704 (e.g., wagering game networks). The external system interface 724 can include logic for exchanging information over wired and wireless networks (e.g., 802.11g transceiver, Bluetooth transceiver, Ethernet transceiver, etc.)

The I/O bus 722 is also connected to a location unit 738. The location unit 738 can create player information that indicates the wagering game machine's location/movements in a casino. In some embodiments, the location unit 738 includes a global positioning system (GPS) receiver that can determine the wagering game machine's location using GPS satellites. In other embodiments, the location unit 738 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 7, in some embodiments, the location unit 738 is not connected to the I/O bus 722.

In one embodiment, the wagering game machine 706 can include additional peripheral devices and/or more than one of each component shown in FIG. 7. For example, in one embodiment, the wagering game machine 706 can include multiple external system interfaces 724 and/or multiple CPUs 726. In one embodiment, any of the components can be integrated or subdivided.

In one embodiment, the wagering game machine 706 includes an instant player profiler module 737. The instant player profiler module 737 can process communications, commands, or other information, where the processing can automatically generate a player profile.

Furthermore, any component of the wagering game machine 706 can include hardware, firmware, and/or machine-readable media including instructions for performing the operations described herein.

Example Mobile Wagering Game Machine

Figure 8:
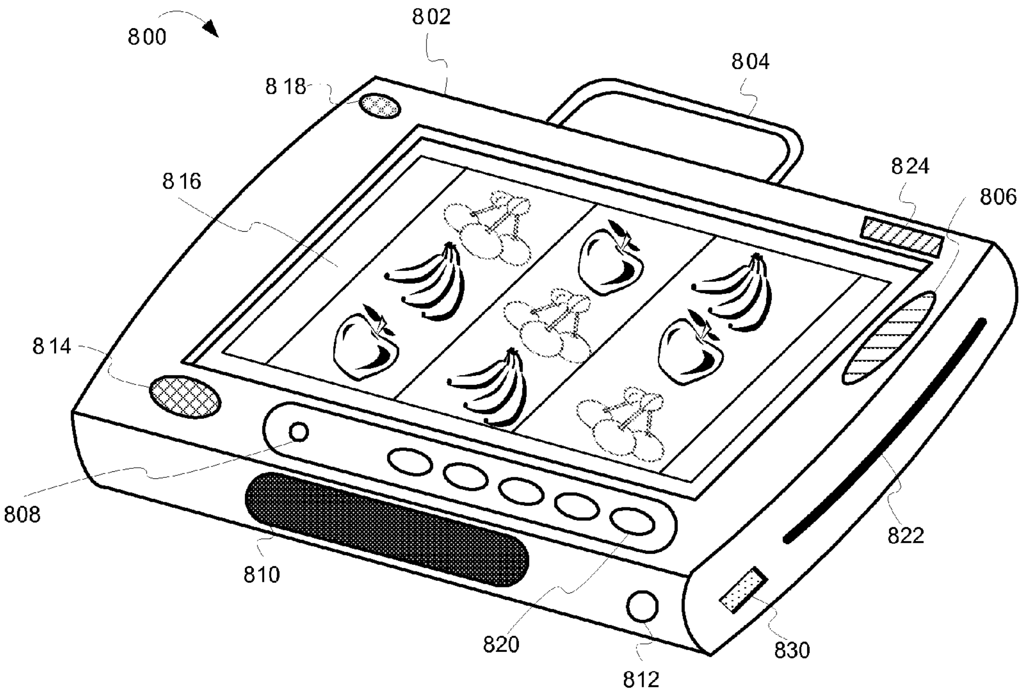
FIG. 8 is an illustration of a mobile wagering game machine 800, according to some embodiments.

FIG. 8 is a conceptual diagram that illustrates an example of a mobile wagering game machine 800, according to some embodiments. In FIG. 8, the mobile wagering game machine 800 includes a housing 802 for containing internal hardware and/or software such as that described above vis-à-vis FIG. 7. In one embodiment, the housing has a form factor similar to a tablet PC, while other embodiments have different form factors. For example, the mobile wagering game machine 800 can exhibit smaller form factors, similar to those associated with personal digital assistants. In one embodiment, a handle 804 is attached to the housing 802. Additionally, the housing can store a foldout stand 810, which can hold the mobile wagering game machine 800 upright or semi-upright on a table or other flat surface.

The mobile wagering game machine 800 includes several input/output devices. In particular, the mobile wagering game machine 800 includes buttons 820, audio jack 808, speaker 814, display 816, biometric device 806, wireless transmission devices 812 and 824, microphone 818, and card reader 822. Additionally, the mobile wagering game machine can include tilt, orientation, ambient light, or other environmental sensors.

In one embodiment, the mobile wagering game machine 800 uses the biometric device 806 for authenticating players, whereas it uses the display 816 and speakers 814 for presenting wagering game results and other information (e.g., credits, progressive jackpots, etc.). The mobile wagering game machine 800 can also present audio through the audio jack 808 or through a wireless link such as Bluetooth.

In one embodiment, the wireless communication unit 812 can include infrared wireless communications technology for receiving wagering game content while docked in a wager gaming station. The wireless communication unit 824 can include an 802.11G transceiver for connecting to and exchanging information with wireless access points. The wireless communication unit 824 can include a Bluetooth transceiver for exchanging information with other Bluetooth enabled devices.

In one embodiment, the mobile wagering game machine 800 is constructed from damage resistant materials, such as polymer plastics. Portions of the mobile wagering game machine 800 can be constructed from non-porous plastics which exhibit antimicrobial qualities. Also, the mobile wagering game machine 800 can be liquid resistant for easy cleaning and sanitization.

In some embodiments, the mobile wagering game machine 800 can also include an input/output ("I/O") port 830 for connecting directly to another device, such as to a peripheral device, a secondary mobile machine, etc. Furthermore, any component of the mobile wagering game machine 800 can include hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. One or more non-transitory machine-readable media having stored thereon instructions, which when executed by one or more processors causes the one or more processors to perform operations generating a player profile, the operations comprising:

presenting, on a display device for selection by a player, a first image and a second image, wherein the first image depicts a picture of a first thematic type, wherein the second image depicts a picture of a second thematic type, and wherein the presenting the first and second images is independent of any wagering game;

detecting player input indicating selection of the first image over the second image;

determining, based on the player input, that the player has a preference for the first thematic type over the second thematic type;

generating a wagering game player profile including an indication that the player has a preference for the first thematic type;

determining a wagering game with a game theme consistent with the first thematic type; and presenting, based on the player profile, a suggestion to play the wagering game.

2. The one or more non-transitory machine-readable media of claim 1, wherein the player input includes information indicating a strength of preference for the first image over the second image.

3. The one or more non-transitory machine-readable media of claim 1, wherein the game theme includes one or more of themed graphics and themed audio.

4. The one or more non-transitory machine-readable media of claim 3, wherein the theme comprises one or more of a television show theme, a science fiction theme, a western theme, and a movie theme.

5. The one or more non-transitory machine-readable media of claim 1, said operations further comprising:

detecting, after presenting the suggestion, a request to play the wagering game;

presenting the wagering game;

presenting, after conclusion of the wagering game, a plurality of images for selection by the player;

detecting additional player input indicating selection of one of the plurality of images; and determining, based the additional player input, that the player likes the game theme.

6. A computer-implemented method comprising:

presenting, on a display device, at least two images, wherein each of the two images depicts a differing thematic picture and wherein presentation of the two images is not part of any wagering game;

detecting selection of an image, wherein the image is one of the at least two images;

determining metadata associated with the image, wherein the metadata describes a theme of the image;

determining a wagering game theme preference based on the metadata;

associating the wagering game theme preference with a player account;

detecting access to the player account;

detecting selection of a wagering game for play;

configuring a theme for the wagering game that is consistent with the wagering game theme preference indicated in the player account.

7. The computer-implemented method of claim 6, further comprising:

determining additional images based on the image; and presenting the additional images on the device, wherein the presenting additional images in not part of any wagering game.

8. The computer-implemented method of claim 6, further comprising:

presenting a plurality of sub-images related to the image; and detecting a player response to the sub-images indicating ratings for the sub-images.

9. The computer-implemented method of claim 6, wherein the wagering game preference indicates a theme for graphics and audio used in the wagering game.

10. The computer-implemented method of claim 6, further comprising:

making, based on the metadata, one or more wagering games available for play.

11. A system comprising:

a wagering game machine comprising, an item comparison controller configured to present a plurality of pictures and a plurality of sub-pictures on a display, wherein each of the plurality of pictures depicts differing pictorial themes, wherein the plurality of sub-pictures depict sub-topics related to each of the differing pictorial themes, wherein presentation of the plurality of pictures and sub-pictures is not part of any wagering game; and a player input module configured to receive player input selecting one of the plurality of pictures, wherein receipt of the player input in not part of any wagering game;

detect arrangement of the sub-pictures in a player-preferred order on the display; and determine a ranking of the sub-topics based on the player-preferred order.

12. The system of claim 11, wherein the ranking indicates a relative liking of the differing pictorial themes.

13. The system of claim 11, wherein the at least one of the plurality of pictures has associated descriptive metadata that describes its individual pictorial theme.

14. The system of claim 11, wherein the item comparison controller is further configured to present sub-picture images belonging to the set of sub-pictures as movable objects that a wagering game player can drag around the display and drop into desired positions on the display, and wherein the player input module is further configured to automatically generate rating scores based on the arrangement order of the movable objects in the desired positions on the display.

15. The system of claim 14, wherein the item comparison controller is configured to determine the set of sub-pictures based on a player indication of an aesthetic preference for the one pictorial theme.

16. The system of claim 11, wherein the item comparison controller is configured to present the plurality of pictures upon conclusion of the wagering game to determine feedback for the wagering game.

17. The system of claim 11, further comprising:

a wagering game server configured to determine one or more wagering game themes using the ranking of the sub-topics.

18. The system of claim 11 further comprising:

an account server comprising, an instant profiler processor configured to generate a wagering game player profile configured to indicate player preferences for wagering games including from the pictorial themes, wherein the player preferences are based on the ranking.

* * * * *